(12) United States Patent
Lee et al.

(10) Patent No.: US 9,030,434 B2
(45) Date of Patent: *May 12, 2015

(54) TOUCH DISPLAY PANEL AND TOUCH SENSING UNIT THEREOF

(71) Applicant: AU Optronics Corp., Hsin-Chu (TW)

(72) Inventors: Hsin-Hung Lee, Hsin-Chu (TW); Pei-Yu Chen, Hsin-Chu (TW); Yu-Mei Chiu, Hsin-Chu (TW); Wei-Jen Chang, Hsin-Chu (TW); Yu-Chuan Lin, Hsin-Chu (TW); Kuo-Hsing Cheng, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/029,785

(22) Filed: Sep. 17, 2013

(65) Prior Publication Data

US 2014/0015797 A1    Jan. 16, 2014

Related U.S. Application Data

(62) Division of application No. 12/700,737, filed on Feb. 5, 2010, now Pat. No. 8,570,285.

(30) Foreign Application Priority Data

Oct. 23, 2009    (TW) ................................ 98135896 A (51) Int. Cl.
*G06F 3/041* (2006.01)
*G06F 3/044* (2006.01)

(52) U.S. Cl.
CPC ...... *G06F 3/044* (2013.01); *G06F 2203/04111* (2013.01)

(58) Field of Classification Search
CPC ............ G06F 2203/0411; G06F 3/044; G06F 2203/04111
USPC ........................................................... 345/173
See application file for complete search history.

(56) References Cited

U.S. PATENT DOCUMENTS

| | | | |
|---|---|---|---|
| 5,867,151 A * | 2/1999 | Nakai | ............................ 345/173 |
| 5,917,564 A | 6/1999 | Kim | |
| 6,465,285 B2 | 10/2002 | Tokuhiro | |
| 7,382,421 B2 | 6/2008 | Hoffman | |
| 8,305,294 B2 * | 11/2012 | Cok et al. | ........................ 345/1.3 |
| 2006/0043377 A1 | 3/2006 | Hoffman | |
| 2008/0024704 A1 * | 1/2008 | Huang | ............................ 349/123 |

(Continued)

*Primary Examiner* — Sahlu Okebato
(74) *Attorney, Agent, or Firm* — Winston Hsu; Scott Margo (57) ABSTRACT

A touch display panel includes a display panel and a touch sensing unit. The touch sensing unit includes first sensing series, and second sensing series. Each of the first sensing series includes a plurality of first transparent sensing pads and a plurality of non-transparent bridge lines disposed along a first direction. Each of the non-transparent bridge lines is disposed between two adjacent first transparent sensing pads, overlapping with two adjacent first transparent sensing pads, and electrically connected to two adjacent first transparent sensing pads. The line width of each non-transparent bridge line is substantially between 0.5 micrometers and 10 micrometers, and the reduction of aperture ratio in a pixel region of the touch display panel caused by the non-transparent bridge lines is substantially between 0.1% and 5%. Each non-transparent bridge line and the long axis of each sub-pixel region are disposed in a non-parallel manner with each other.

15 Claims, 6 Drawing Sheets

(56) References Cited

U.S. PATENT DOCUMENTS

2008/0150906 A1* 6/2008 Grivna .......................... 345/173
2008/0158181 A1* 7/2008 Hamblin et al. .............. 345/173
2008/0264699 A1* 10/2008 Chang et al. ................ 178/18.01
2009/0159344 A1* 6/2009 Hotelling et al. ........... 178/18.06
2009/0160824 A1* 6/2009 Chih-Yung et al. ............ 345/175

* cited by examiner

| Size of the Non-transparent Bridge Lines (micrometers) | Non-transparent Bridge Line Direction | Second Aperture Ratio (%) | First Aperture Ratio (%) | Aperture Ratio Variation (%) | Just Noticeable Difference (JND) |
|---|---|---|---|---|---|
| 10 x 260 | Parallel | 58.23 | 64.56 | 6.33 | 2.6 |
| 10 x 240 | Parallel | 58.72 | 64.56 | 5.84 | 2.6 |
| 10 x 220 | Parallel | 59.20 | 64.56 | 5.36 | 2.6 |
| 08 x 260 | Parallel | 58.96 | 64.56 | 5.60 | 2.6 |
| 08 x 220 | Parallel | 59.74 | 64.56 | 4.82 | < 2.0 |
| 06 x 260 | Parallel | 59.69 | 64.56 | 4.87 | 2.3 |
| 06 x 240 | Parallel | 59.98 | 64.56 | 4.58 | < 2.0 |
| 06 x 220 | Parallel | 60.27 | 64.56 | 4.29 | < 2.0 |
| 10 x 260 | Perpendicular | 61.85 | 64.56 | 2.71 | 2.2 |
| 10 x 240 | Perpendicular | 62.06 | 64.56 | 2.50 | 2.3 |
| 10 x 220 | Perpendicular | 62.26 | 64.56 | 2.30 | < 2.0 |
| 08 x 260 | Perpendicular | 62.16 | 64.56 | 2.40 | 2.2 |
| 08 x 240 | Perpendicular | 62.33 | 64.56 | 2.23 | < 2.0 |
| 08 x 220 | Perpendicular | 62.49 | 64.56 | 2.07 | < 2.0 |
| 06 x 260 | Perpendicular | 62.47 | 64.56 | 2.09 | < 2.0 |
| 06 x 240 | Perpendicular | 62.60 | 64.56 | 1.96 | 2 |
| 06 x 220 | Perpendicular | 62.72 | 64.56 | 1.84 | < 2.0 |

TOUCH DISPLAY PANEL AND TOUCH SENSING UNIT THEREOF

CROSS REFERENCE TO RELATED APPLICATIONS

This application is a division of application Ser. No. 12/700,737 filed on Feb. 5, 2010, now allowed, which is incorporated by reference herein in its entirety.

BACKGROUND OF THE INVENTION

1. Field of the Invention

The present invention relates to a touch display panel and a touch sensing unit thereof, and more particularly to a touch display panel with non-transparent bridge lines of a high electrical conductivity electrically connected to transparent conductive pads, and a touch sensing unit thereof. The line width of each of the non-transparent bridge lines is substantially between 0.5 micrometer and 10 micrometers, and an aperture ratio of pixel regions of the touch display panel occupied by the non-transparent bridge lines is substantially between 0.1% and 5%.

2. Description of the Prior Art

In present consumer electronics, tablet personal computers, personal digital assistants (PDA), mobile phones, global positioning systems (GPS), multimedia players and other portable electronic devices widely apply touch panels to replace conventional keyboards as the data communicational interface between human and the electronic devices, such that the size of the electronic devices can be reduced.

Conventional touch panels mainly utilize a touch sensing unit including a plurality of first transparent sensing pads aligned along a first direction (i.e. a horizontal direction) and a plurality of second transparent sensing pads aligned along a second direction (i.e. a vertical direction) to achieve the touch input function. When an input device such as a finger is touched or pressed on a certain position of the touch panel, at least one of the first transparent sensing pads forms a capacitor with the input device and at least one of the second transparent sensing pads forms another capacitor with the input device. A reading circuit of the touch display panel determines the position of the input device through correlating the capacitance between the input device and the first transparent sensing pads and the capacitance between the input device and the second transparent sensing pads. The transparent sensing pads are made of a transparent conductive material, but the transparent conductive material has a higher resistance so that the touch input signals cannot be easily identified when the transparent conductive material is applied in a large size touch panel. Therefore, a metallic bridge line of a lower resistance is often used to electrically connect adjacent transparent sensing pads in order to reduce an overall resistance of the touch sensing unit and increase the touch sensitivity of the touch panel. However, since the metallic bridge line is made of a non-transparent material, the metallic bridge line would cause the aperture ratio of the touch display panel to decrease when the line width of the metallic bridge line is too broad. In addition, during the fabrication of the metallic bridge lines of conventional touch panels, breakages of the metallic bridge lines often occur due to over etching, and thereby the breakages affect the yields of the touch panels. Therefore, the conventional method utilizing the metallic bridge lines to connect the transparent sensing pads still requires further improvements.

SUMMARY OF THE INVENTION

It is one of the objectives of the present invention to provide a touch display panel and a touch sensing unit thereof, to improve the touch sensitivity and the yield of the touch display panel.

According to the present invention, the present invention provides a touch sensing unit applicable to a touch display panel. The touch sensing unit described above includes a plurality of first transparent sensing pads and a plurality of non-transparent bridge lines. The first transparent sensing pads are disposed along a first direction, the non-transparent bridge lines are disposed along the first direction, each of the non-transparent bridge lines is respectively disposed between two adjacent first transparent sensing pads, each of the non-transparent bridge lines partially overlaps with two adjacent first transparent sensing pads, and each of the non-transparent bridge lines is electrically connected to two adjacent first transparent sensing pads. A line width of each of the non-transparent bridge lines is substantially between 0.5 micrometers and 10 micrometers, and an aperture ratio of pixel region of the touch display panel occupied by the non-transparent bridge lines is substantially between 0.1% and 5%.

According to the present invention, the present invention further provides a touch display panel including a display panel and a touch sensing unit. The display panel includes a plurality of pixel regions. The touch sensing unit is disposed on the display panel, and the touch sensing unit includes a plurality first sensing series disposed along the first direction on the display panel and a plurality of second sensing series disposed along a second direction on the display panel. Each of the first sensing series includes a plurality of first transparent sensing pads disposed along the first direction on the display panel, and a plurality of non-transparent bridge lines disposed along the first direction on the display panel. The non-transparent bridge lines are respectively disposed between two adjacent first transparent sensing pads, the non-transparent bridge lines are partially overlapped with two adjacent first transparent sensing pads, and the non-transparent bridge lines are electrically connected to two adjacent first transparent sensing pads. A line width of each of the non-transparent bridge lines is substantially between 0.5 micrometers and 10 micrometers, and an aperture ratio of the pixel regions occupied by the non-transparent bridge lines is substantially between 0.1% and 5%.

The touch display panel in accordance to the present invention utilizes non-transparent bridge lines of a high electrical conductivity to connect with the first transparent sensing pads so that the touch sensitivity of the touch sensing unit of the touch display panel is improved. Since the line width of each of the non-transparent bridge lines is substantially between 0.5 micrometers and 10 micrometers, the non-transparent bridge lines contribute negligible effects on the aperture ratio of the touch display panel.

These and other objectives of the present invention will no doubt become obvious to those of ordinary skill in the art after reading the following detailed description of the preferred embodiment that is illustrated in the various figures and drawings.

DETAILED DESCRIPTION

To provide a better understanding of the present invention, preferred embodiments will be detailed as follows. The preferred embodiments of the present invention are illustrated in the accompanying drawings with numbered elements to elaborate the contents and effects to be achieved.

Figure 1:
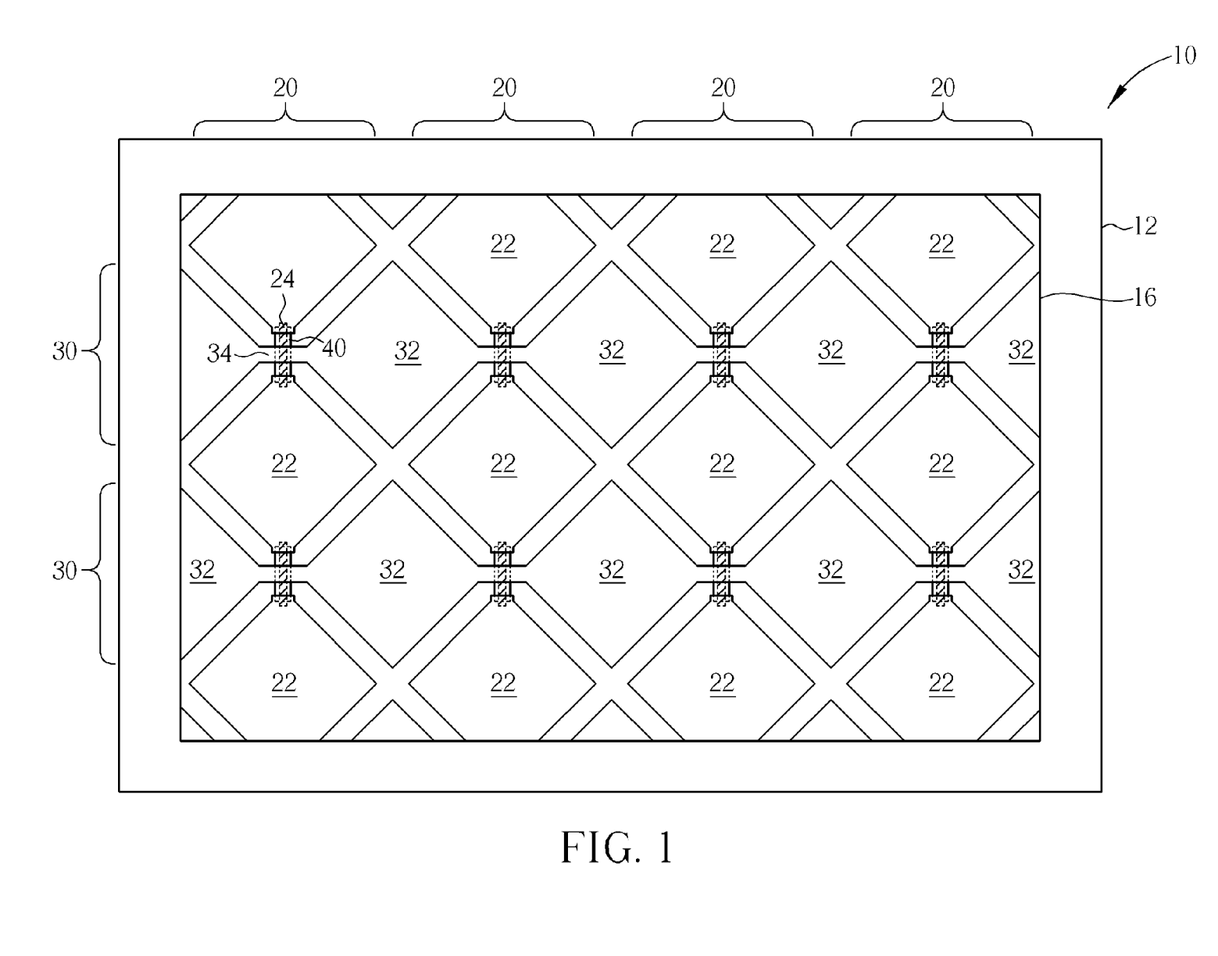
FIG. 1 is a schematic top view diagram in accordance to the touch display panel of the present embodiment.
Figure 2:
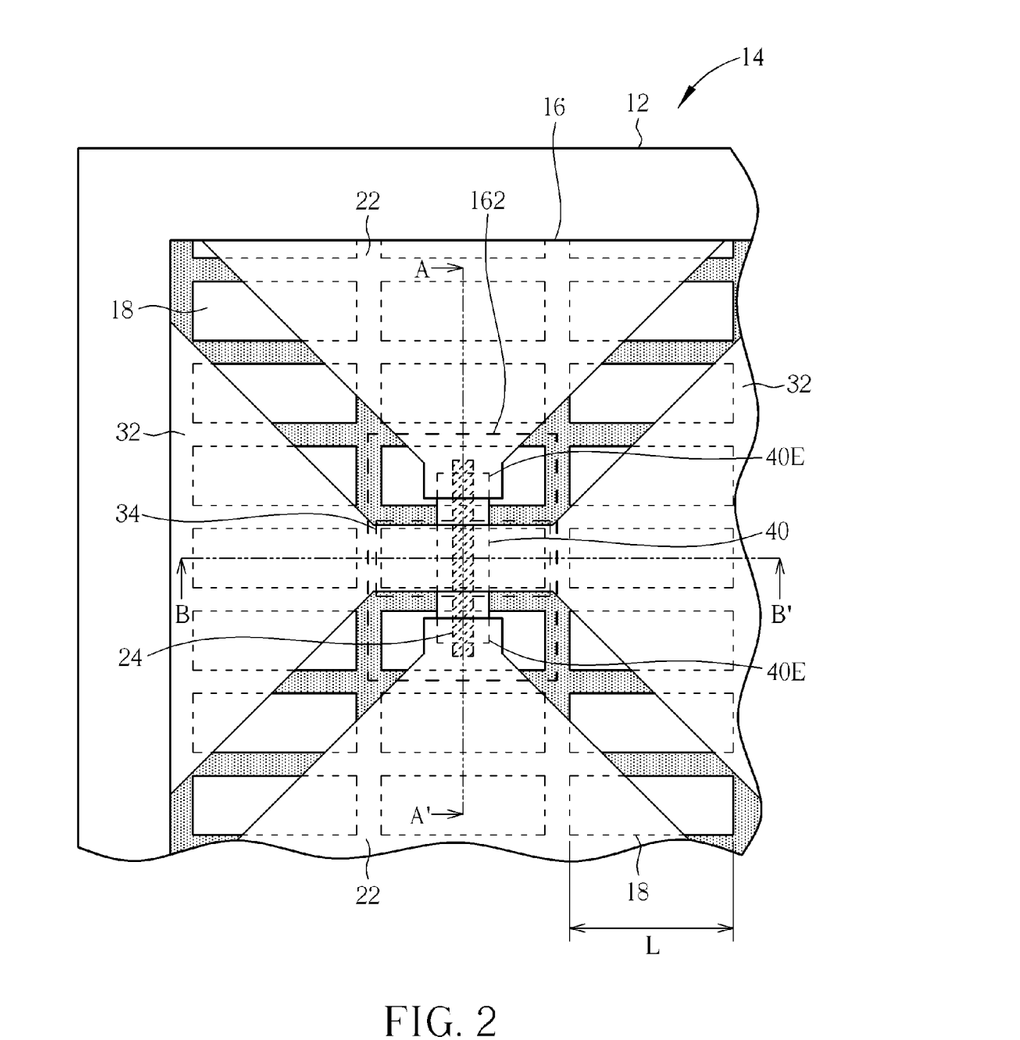
FIG. 2 is a schematic zoom-in diagram of the touch sensing unit in accordance to the touch display panel of the present embodiment.
Figure 3:
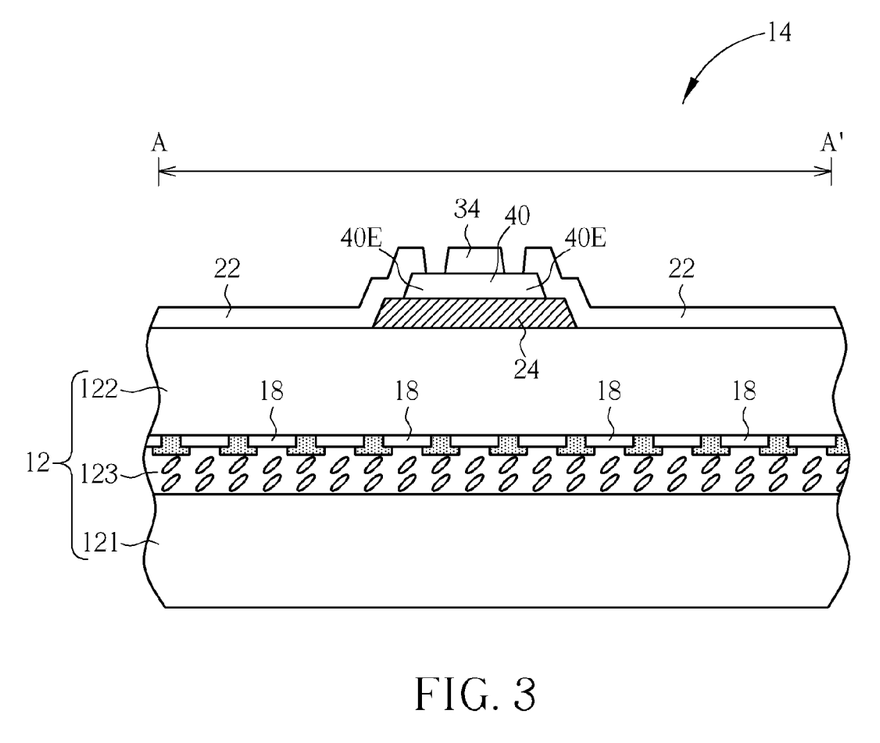
FIG. 3 is a schematic cross-sectional diagram of the touch sensing unit in accordance to the touch display panel of the present embodiment along line A-A'.
Figure 4:
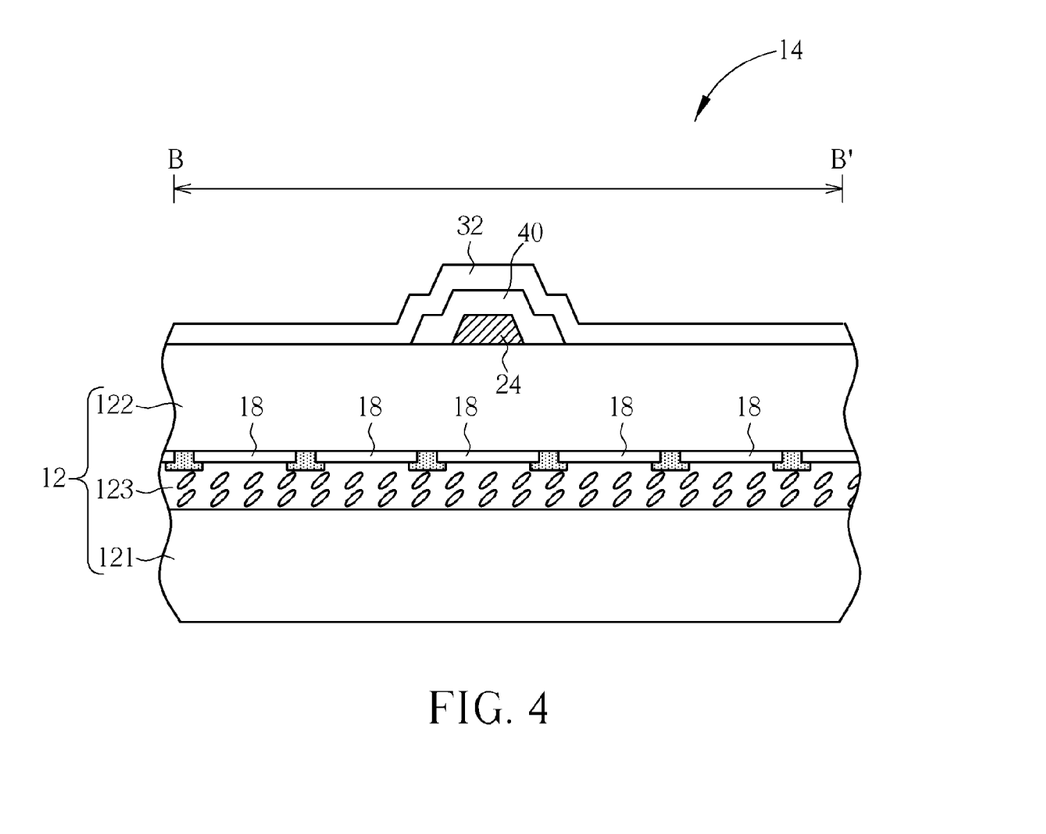
FIG. 4 is a schematic cross-sectional diagram of the touch sensing unit in accordance to the touch display panel of the present embodiment along line B-B'.

Referring to FIG. 1 to FIG. 4, FIG. 1 to FIG. 4 are schematic diagrams illustrating a touch display panel of a preferred embodiment in accordance to the present invention. FIG. 1 is a schematic top view diagram in accordance to the touch display panel of the present embodiment. FIG. 2 is a schematic zoom-in diagram of the touch sensing unit in accordance to the touch display panel of the present embodiment. FIG. 3 is a schematic cross-sectional diagram of the touch sensing unit in accordance to the touch display panel of the present embodiment along line A-A'. FIG. 4 is a schematic cross-sectional diagram of the touch sensing unit in accordance to the touch display panel of the present embodiment along line B-B'. As illustrated in FIG. 1 to FIG. 4, the touch display panel 10 in accordance to the present embodiment includes a display panel 12 and a touch sensing unit 14. The display panel 12 includes a display region 16 and the display region 16 includes a plurality of pixel regions 162 arranged in a matrix form. The touch sensing unit 14 is disposed in the display region 16 of the display panel 12. Each of the pixel regions 162 can include three sub-pixel regions, e.g. a red sub-pixel region, a green sub-pixel region and a blue sub-pixel region. The display panel 12 in accordance to the present embodiment is a liquid crystal display panel and the display panel 12 includes an array substrate 121, a color filter substrate 122, and a liquid crystal layer 123 disposed between the array substrate 121 and the color filter substrate 122. The color filter substrate 122 has a plurality of color filters 18 disposed thereon. The display panel 12 is a liquid crystal display panel, but is not limited thereto. The display panel 12 may be other types of flat display panels, e.g. electroluminescence display (ELD) panels, plasma display panels (PDP), field emission display (FED) panels and etc. The structures of the display panel 12 are not described in detail since those should be obvious for one skilled in the art.

As illustrated in FIG. 1 to FIG. 4, the touch sensing unit 14 includes a plurality of first sensing series 20 disposed on the display panel 12 and a plurality of second sensing series 30 disposed on the display panel 12. The first sensing series 20 are disposed along a first direction (i.e. a vertical direction of FIG. 2) and the second sensing series 30 are disposed along a second direction (i.e. a horizontal direction of FIG. 2). Furthermore, the second sensing series 30 are disposed over the first sensing series 20, while the first sensing series 20 and the second sensing series 30 are electrically insulated. Each of the first sensing series 20 includes a plurality of first transparent sensing pads 22 disposed along the first direction on the display panel 12, and a plurality of non-transparent bridge lines 24 disposed along the first direction on the display panel 12. The non-transparent bridge lines 24 are disposed below the first transparent sensing pads 22. Each of the non-transparent bridge lines 24 is respectively disposed between two adjacent first transparent sensing pads 22, each of the non-transparent bridge lines 24 partially overlaps with two adjacent first transparent sensing pads 22, and each of the non-transparent bridge lines 24 is electrically connected to two adjacent first transparent sensing pads 22. The non-transparent bridge lines 24 have a resistance smaller than a resistance of the first transparent sensing pads 22 so that an overall resistance of the first sensing series 20 is lowered. For example, the non-transparent bridge lines 24 may be metallic bridge lines of a lower resistance than the resistance of the first transparent sensing pad 22, or the non-transparent bridge lines 24 can be made of other materials of fine electrical conductivity. In addition, each of the second sensing series 30 includes a plurality of second transparent sensing pads 32 disposed along the second direction on the display panel 12 and a plurality of transparent bridge lines 34 disposed along the second direction on the display panel 12. Each of the transparent bridge lines 34 is electrically connected to two adjacent second transparent sensing pads 32 respectively. Also, the transparent bridge lines 34 and the second transparent sensing pads 32 in accordance to the present embodiment are made of the same transparent conductive layer, but it is not limited thereto.

A line width of each of the non-transparent bridge lines 24 in accordance to the present embodiment is substantially between 0.5 micrometers and 10 micrometers. Through varying the line width of the non-transparent bridge lines 24 within the range given above, the non-transparent bridge lines 24 cannot be identified by eyes of the observers. The aperture ratio of the pixel regions 162 occupied by the non-transparent bridge lines 24 is only substantially between 0.1% and 5%; therefore, the non-transparent bridge lines 24 have negligible effects on the aperture ratio of the touch display panel 10. In addition, although the line width of the non-transparent bridge lines 24 in accordance to the present embodiment is only substantially between 0.5 micrometers and 10 micrometers, the non-transparent bridge lines 24 can still exhibit good electrical conductivity. Therefore, an overall resistance of the first sensing series 20 can be lowered with the installation of the non-transparent bridge lines 24, and the touch sensitivity of the touch display panel 10 is improved when the overall resistance is lowered.

As illustrated in FIG. 1 to FIG. 4, the touch display panel in accordance to the present embodiment further includes a plurality of patterned insulating layers 40 respectively disposed between each of the transparent bridge lines 34 and each of the non-transparent bridge line 24 corresponding to each of the transparent bridge lines 34. To be exact, the patterned insulating layers 40 are disposed on the non-transparent bridge lines 24, and the transparent bridge lines 34 are disposed on the patterned insulating layers 40, so that the patterned insulating layers 40 electrically insulate the transparent bridge lines 34 of the second sensing series 30 from the non-transparent bridge lines 24 of the first sensing series 20 below in order to avoid short circuiting. Furthermore, each of the patterned insulating layers 40 in accordance to the present embodiment further includes an extended insulating portion 40E extending towards bottoms of two adjacent first transparent sensing pads 22 so that each of the extended insulating portions 40E, each of the non-transparent bridge lines 24 and each of the first transparent sensing pads 22 partially overlap with one another. The extended insulating portions 40E of the patterned insulating layers 40 protect the non-transparent bridge lines 24 so that the non-transparent bridge lines 24 are not corroded and line breakages of the non-transparent bridge lines 24 during the etching process of defining the first transparent sensing pads 22 can be avoided; therefore the yield of the touch display panel 10 can be ensured.

The shape of each of the color filters 18 is substantially corresponding to the shape of the sub-pixel regions (not illustrated in the figure), for example the shape of each of the color filters 18 is a rectangle having a long axis L. Each of the non-transparent bridge lines 24 and some of the color filters 18 partially overlap in a perpendicular projection direction, and each of the non-transparent bridge lines 24 and the long axis L of each of the color filters 18 are disposed in a non-parallel manner with each other. Each of the non-transparent bridge lines 24 and the long axis L of each of the color filters 18 in accordance to the present embodiment are preferably disposed perpendicularly with each other, as illustrated in FIG. 2. The advantage of the non-transparent bridge lines 24 disposed perpendicularly with respect to the long axis L of the color filters 18 is that under such configuration, the observers can hardly notice the existence of the non-transparent bridge lines 24.

Figure 5:
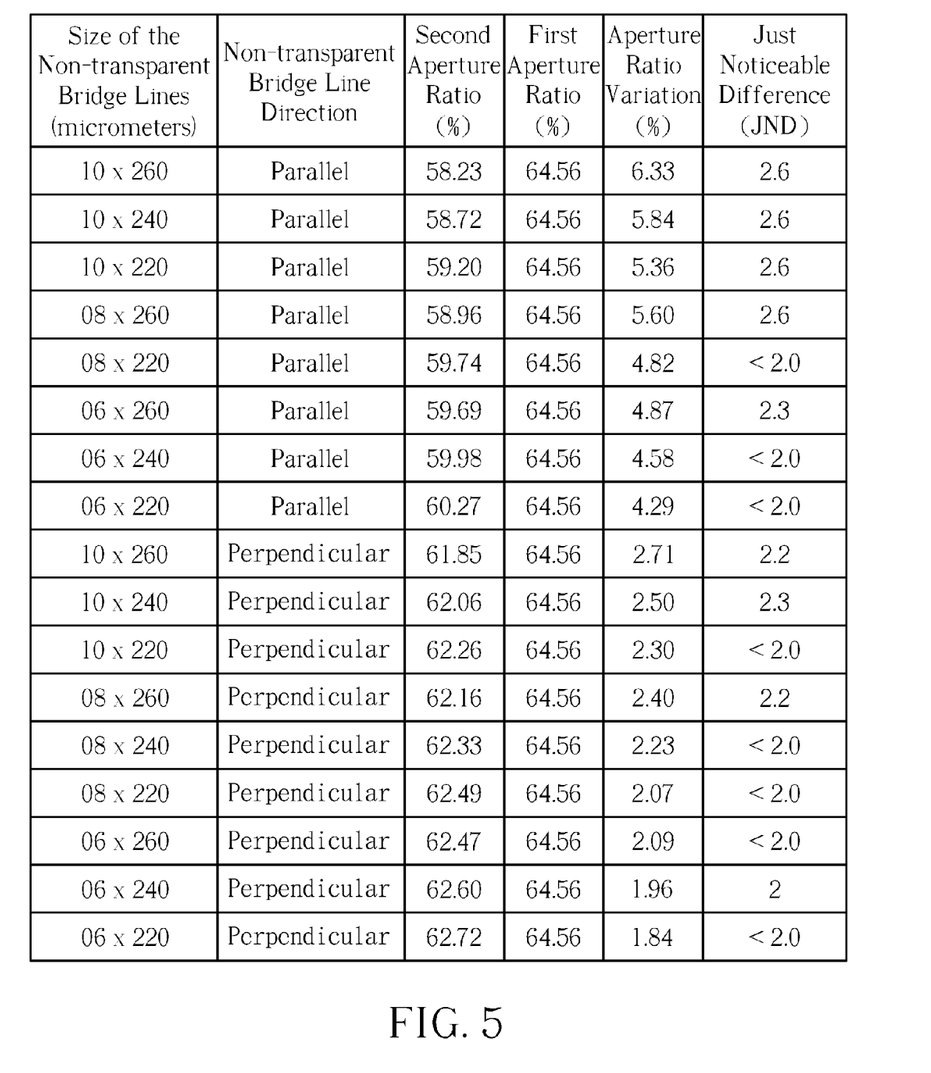
FIG. 5 lists experimental results of variations of the aperture ratio of the pixel regions with respect to different sizes of the non-transparent bridge lines, and relationships between configurations of the non-transparent bridge lines and just noticeable difference (JND) in accordance to the touch display panel of the present invention.

Referring to FIG. 5, FIG. 5 lists experimental results of variations of the aperture ratio of the pixel regions with respect to different sizes of the non-transparent bridge lines, and relationships between configurations of the non-transparent bridge lines and just noticeable difference (JND) in accordance to the touch display panel of the present invention. In FIG. 5, the "Size of the Non-transparent Bridge Lines" is represented by the line width*length (i.e. 10*260 would represent the non-transparent bridge lines having a line width of 10 micrometers and a length of 260 micrometers, and so on). The "Non-transparent Bridge Line Direction" represents the direction of the non-transparent bridge lines with respect to the long axes of the color filters (i.e. parallel or perpendicular). The "First Aperture Ratio" represents the aperture ratio of the pixel regions 162 before installation of the non-transparent bridge lines. The "Second Aperture Ratio" represents the aperture ratio of the pixel regions 162 after installations of the non-transparent bridge lines. The "Aperture Ratio Variation" represents the differences between the second aperture ratio and the first aperture ratio, and the "Aperture Ratio Variation" also represents the aperture ratio of the touch display panel occupied by the non-transparent bridge lines. The "Just Noticeable Difference (JND)" is used to evaluate the noticeable ability of human visions to the non-transparent bridge lines, and the lower the JND means the lower the noticeable ability of human visions to the non-transparent bridge lines. As illustrated in FIG. 5, a normal aperture ratio of the touch display panel (first aperture ratio) is 64.56% with the installations of the non-transparent bridge lines. The aperture ratio of the touch display panel without the installation of the non-transparent bridge lines (second aperture ratio) is decreased due to the light-shielding characteristic of the non-transparent bridge lines. As the line width of the non-transparent bridge lines decreases, variations of the aperture ratio can be clearly observed. For example, when the non-transparent bridge lines are disposed in parallel with each other, as the line width of the non-transparent bridge lines decreases from 10 micrometers*260 micrometers to 6 micrometers*260 micrometers, the second aperture ratio of the touch display panel increases from 58.23% to 59.69%. In other words, the aperture ratio of the touch display panel occupied by the non-transparent bridge lines decreases from 6.33% to 4.87%. Therefore, decreasing the line width of the non-transparent bridge lines could certainly raise the aperture ratio of the touch display panel. Moreover, as clearly illustrated in FIG. 5, when the line width of each of the non-transparent bridge line stays the same, the just noticeable difference with the non-transparent bridge lines and the long axes of the color filters disposed in perpendicular with each other, is lower than the just noticeable difference with the non-transparent bridge lines and the long axes of the color filters disposed in parallel with each other. For example, when the line width of the non-transparent bridge lines is 8 micrometers*260 micrometers, and the non-transparent bridge lines disposed in parallel with respect to the long axes of the color filters, the just noticeable difference is 2.6 while under the same line width, the non-transparent bridge lines disposed in perpendicular with respect to the long axes of the color filters has the just noticeable difference reduced to 2.2.

Figure 6:
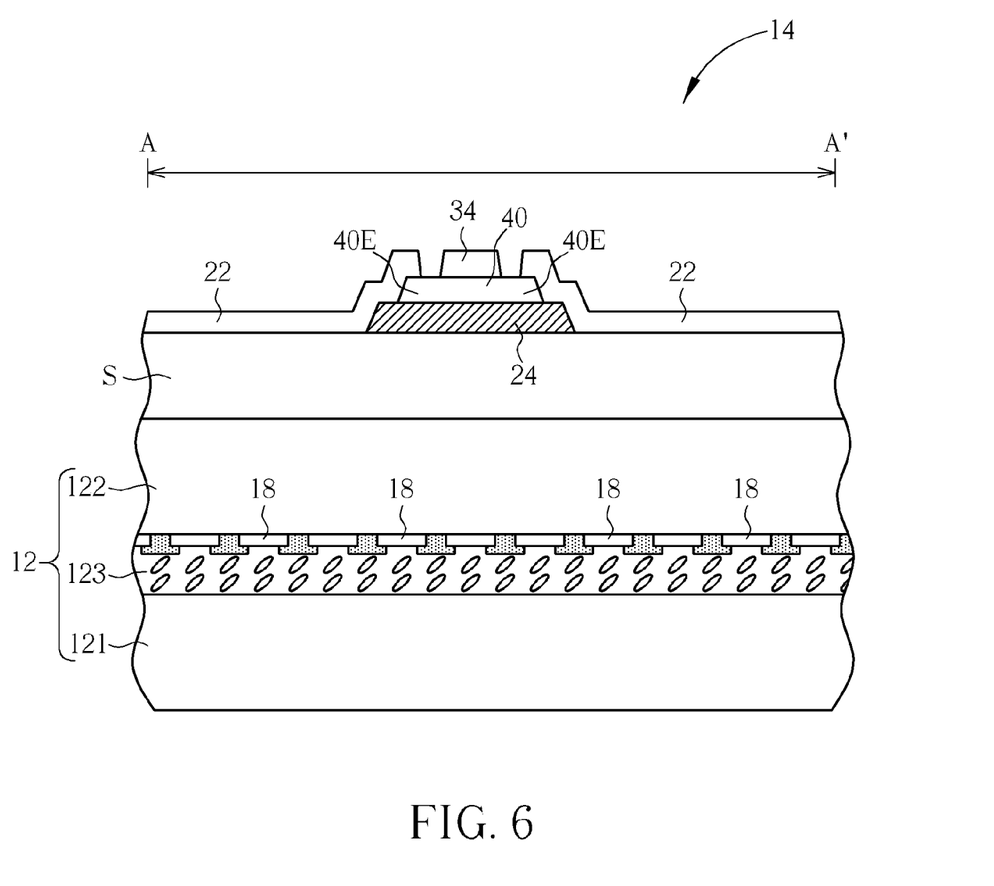
FIG. 6 is a schematic diagram illustrating the touch display panel of another preferred embodiment in accordance to the present invention.

Again referring to FIG. 6, FIG. 6 is a schematic diagram illustrating a touch display panel of another preferred embodiment in accordance to the present invention. To simplify the description and for the convenience of comparison between each of the embodiments of the present invention, identical elements are denoted by identical numerals. Also, only the differences are illustrated. As illustrated in FIG. 6, different from the previously described embodiments, the touch sensing units 14 and the display panel 12 in accordance to the present embodiment have an auxiliary substrate S disposed in between. The touch sensing unit 14 is first disposed on the auxiliary substrate S, then the auxiliary substrate S is pasted on the display panel 12.

In summary, the touch display panel in accordance to the present invention utilizes the non-transparent bridge lines of a high electrical conductivity to connect the first transparent sensing pads, so that the touch sensitivity of the touch sensing unit of the touch display panel is improved. Also, since the line width of the non-transparent bridge lines is substantially between 0.5 micrometers and 10 micrometers, the non-transparent bridge lines have negligible effects on the aperture ratio of the touch display panel. In addition, each of the patterned insulating layers has the extended insulating portion extending towards the bottoms of adjacent first transparent sensing pads. The extended insulating portions 40E of the patterned insulating layers 40 protect the non-transparent bridge lines 24 so that the non-transparent bridge lines 24 are not corroded and line breakages of the non-transparent bridge lines 24 during the etching process of defining the first transparent sensing pads 22 can be avoided; therefore the yield of the touch display panel 10 can be ensured. Moreover, the non-transparent bridge lines and the long axis of each of the color filters in accordance to the touch display panel of the present invention are disposed in perpendicular with each other so that the just noticeable difference is reduced. When the just noticeable difference is reduced, it becomes harder for the observers to notice the existence of the non-transparent bridge lines, and the display quality of the touch display panel is improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A touch display panel, comprising:
a display panel, comprising a plurality of pixel region, each of the pixel region including at least three sub-pixel regions; and
a touch sensing unit, disposed on the display panel, the touch sensing unit comprising:
a plurality of first sensing series disposed on the display panel, wherein each of the first sensing series comprises:
a plurality of first transparent sensing pads disposed on the display panel along a first direction; and
a plurality of non-transparent bridge lines disposed on the display panel along the first direction, each of the non-transparent bridge lines being respectively disposed between two adjacent first transparent sensing pads, each of the non-transparent bridge lines partially overlapping with two adjacent first transparent sensing pads, and each of the non-transparent bridge lines being electrically connected to two adjacent first transparent sensing pads, wherein a line width of each of the non-transparent bridge lines is substantially between 0.5 micrometers and 10 micrometers and an aperture ratio of the pixel region occupied by the non-transparent bridge lines is substantially between 0.1% and 5%; and
a plurality of second sensing series disposed on the display panel along a second direction,
wherein each of the sub-pixel regions has a long axis and is located in one of the pixel regions, each of the non-transparent bridge lines and a part of the sub-pixel regions partially overlap in a perpendicular projection direction, and each of the non-transparent bridge lines and the long axis of each of the sub-pixel regions are disposed in a non-parallel manner with each other.

2. The touch display panel of claim 1, wherein each of the second sensing series comprises a plurality of second transparent sensing pads disposed along the second direction on the display panel, and a plurality of transparent bridge lines disposed along the second direction on the display panel.

3. The touch display panel of claim 2, wherein the touch sensing unit further comprises a plurality of patterned insulating layers disposed between each of the second transparent sensing pads and each of the non-transparent bridge lines, and between each of the transparent bridge lines and each of the non-transparent bridge lines.

4. The touch display panel of claim 3, wherein a part of each of the second transparent sensing pads and each of the patterned insulating layers are disposed on each of the non-transparent bridge lines, and a part of each of the transparent bridge lines is disposed on each of the patterned insulating layers.

5. The touch display panel of claim 4, wherein each of the patterned insulating layers further comprises an extended insulating portion, and each of the extended insulating portions, each of the non-transparent bridge lines, and each of the first transparent sensing pads partially overlap with one another.

6. The touch display panel of claim 1, wherein the non-transparent bridge lines comprise metallic bridge lines.

7. The touch display panel of claim 1, further comprising a plurality of color filters corresponding to the sub-pixel regions disposed on the display panel.

8. The touch display panel of claim 7, wherein each of the color filters has a long axis corresponding to the long axis of the sub-pixel region.

9. The touch display panel of claim 8, wherein each of the non-transparent bridge lines is disposed perpendicularly to the long axis of each of the color filters.

10. A touch sensing unit applicable to a touch display panel, the touch display panel comprising a plurality pixel regions, each of the pixel region including at least three sub-pixel regions, the touch sensing unit comprising:
a plurality of first sensing series disposed on the touch display panel, wherein each of the first sensing series comprises:
a plurality of first transparent sensing pads disposed along a first direction;
a plurality of non-transparent bridge lines disposed along the first direction, each of the non-transparent bridge lines being respectively disposed between two adjacent first transparent sensing pads, each of the non-transparent bridge lines partially overlapping with two adjacent first transparent sensing pads, and each of the non-transparent bridge lines being electrically connected to two adjacent first transparent sensing pads, wherein a line width of each of the non-transparent bridge lines is substantially between 0.5 micrometers and 10 micrometers, and an aperture ratio of the pixel region occupied by the non-transparent bridge lines is substantially between 0.1% and 5%; and
a plurality of second sensing series disposed on the touch display panel along a second direction,
wherein each of the sub-pixel regions has a long axis and is located in one of the pixel regions, each of the non-transparent bridge lines and a part of the sub-pixel regions partially overlap in a perpendicular projection direction, and each of the non-transparent bridge lines and the long axis of each of the sub-pixel regions are disposed in a non-parallel manner with each other.

11. The touch sensing unit of claim 10, wherein each of the second sensing series comprises a plurality of second transparent sensing pads and a plurality of transparent bridge lines disposed along the second direction.

12. The touch sensing unit of claim 11, further comprising a plurality of patterned insulating layers disposed between each of the second transparent sensing pads and each of the non-transparent bridge lines.

13. The touch sensing unit of claim 12, wherein each of the patterned insulating layers is disposed on each of the non-transparent bridge lines, and each of the second transparent sensing pads is disposed on each of the patterned insulating layers.

14. The touch sensing unit of claim 13, wherein each of the patterned insulating layers further comprises an extended insulating portion, and each of the extended insulating portions, each of the non-transparent bridge lines and each of the first transparent sensing pads partially overlap with one another.

15. The touch sensing unit of claim 10, wherein the non-transparent bridge lines comprise metallic bridge lines.

* * * * *